United States Patent Office 2,822,345
Patented Feb. 4, 1958

2,822,345

POLYESTER-VINYL MONOMER COMPOSITIONS CONTAINING AMIDINO COMPOUND AND A SULFHYDRYL COMPOUND AND PROCESS FOR COPOLYMERIZING SAME

George Bliss Duhnkrack, Harrison, N. Y., and Charles Ray Mills, Huntington, W. Va., assignors to American Cyanamid Company, New York, N. Y., a corporation of Maine No Drawing. Application January 23, 1957
Serial No. 635,578

17 Claims. (Cl. 260—45.4)

This invention relates to unsaturated polyester resin compositions of controlled polymerization characteristics, that is, resins whose gelation and curing characteristics may be varied over considerable range.

A wide variety of liquid thermosetting polyester resins are in commercial use. These comprise essentially a cross-linking vinyl monomer and an unsaturated linear polyester or alkyd resin formed by condensing and esterifying a polyhydric alcohol and a polycarboxylic acid. While these resins have many excellent characteristics, their gelation and cure are rather slow even at elevated temperatures. By the use of some promoting agents, curing can be accomplished at room temperature with organic peroxide polymerization catalysts, but these particular promoters usually discolor the resin. There is a definite need for faster gelling resins of this class, which may be cured at room temperature without discoloration.

An object of this invention is to provide improved unsaturated polyester resin compositions.

Another object of this invention is to provide improved procedures for promoting the polymerization of unsaturated polyester resin compositions in general.

A further object of this invention is to provide unsaturated polyester compositions which gel more rapidly.

Still another object of the invention is to provide unsaturated linear polyester compositions which may be cured at room temperature to substantially colorless masses.

A still further object of the invention is to provide a faster curing cycle for polyester resins.

Still another object of the invention is to provide a controllable polymerization cycle for unsaturated polyester resins.

Other objects and advantages of the invention will be apparent to those skilled in the art after consideration of the detailed disclosure hereinbelow.

In order to effect cure of a thermosetting polyester resin, heat is usually applied to expedite the polymerization reaction. When polymerization of the mixture is carried out at elevated temperatures, the exothermic heat of reaction may be so great that the attendant stresses and strains developed therefrom often result in cured products which are cracked or badly crazed. It is desirable to effect a rapid gelation of the polymerizable mixture, if possible, and then carry out the final cure of the material over an extended period of time. While no actual saving in the amount of heat required to effect cure would be realized thereby, nevertheless, the danger of generating an excessive exothermic heat would be alleviated by gelling the resin at a lower temperature and in a reduced period of time. Final cure could then be carried out without the danger of the material cracking or crazing.

The present invention is concerned with unsaturated polyester resin compositions and the process of polymerizing these resins. The novel resins comprise one or more unsaturated linear polyesters, one or more copolymerizable monomers containing a $CH_2=C<$ group, and a promoter combination of one or more sulfhydryl compounds and one or more substances of the class consisting of compounds containing a basic

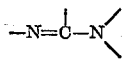

group and tautomers thereof. The term amidino compounds is employed herein for brevity in describing the class of unsubstituted and substituted amidines containing said basic group and their tautomers, including the acid salts of any of these substances. Narrower aspects of the invention relate to selected amidino compounds and specific proportions of the promoter combination.

The major components of the resin compositions are an unsaturated linear polyester derived from a polyhydric alcohol and an olefinic or ethylenic unsaturated polycarboxylic acid and also a monomer having a terminal ethylenic group which is copolymerizable with that polyester.

Among the many suitable polyhydric alcohols are ethylene glycol, diethylene glycol, propylene glycol, dipropylene glycol, trimethylene glycol, tetramethylene glycol, pinacol, arabitol, xylitol, dulcitol, adonitol, mannitol, glycerol, trimethylol propane, trimethylol ethane, sorbitol, 1,1'-isopropylidene bis(p - phenylenoxy)di - 2 - propanol, pentaerythritol, dipentaerythritol, and alkanediols as exemplified by butanediol-1,2, butanediol-1,3, butanediol-1,4, pentanediol - 1,2, pentanediol - 1,4, pentanediol - 1,5, hexanediol-1,6, and the like. It is usually desirable that a dihydric alcohol be employed in major proportion relative to any alcohols containing more than two hydroxy groups which may be used in forming the polyester.

Another essential reactant in forming the present unsaturated alkyds is a polycarboxylic acid. The expressions "polycarboxylic acids" and "dicarboxylic acids" are used herein in their broader sense to include available similarly reacting anhydrides such as maleic and phthalic anhydrides. Among the suitable alpha, beta-ethylenically unsaturated acids are maleic, fumaric, aconitic, itaconic, citraconic, mesaconic, chloromaleic, carbic, etc., acids, and mixtures thereof. Substantial amounts of polycarboxylic acids which are free of non-benzenoid unsaturation may also be used, but the unsaturated acids should be present in an amount approximating at least 5% by weight of the total weight of the polycarboxylic acids used. Frequently the olefinic or ethylenically unsaturated acids amount to between about 25% and 65% by weight on the same basis. Examples of polycarboxylic acids which are free of non-benzenoid unsaturation include phthalic, oxalic, malonic, succinic, glutaric, sebacic, adipic, pimelic, suberic, azelaic, tricarballylic, citric, tartaric and malic acids, and mixtures thereof.

In the preparation of the polymerizable unsaturated polyesters, one may use the polyhydric alcohols and the polycarboxylic acids in substantially equimolar proportions; but an excess of the alcohol approximating 10 or 15% above the stoichiometric quantity required for complete esterification of the acid is preferred. Where a polyhydric alcohol containing more than two hydroxy groups or a polycarboxylic acid having more than two carboxyl groups is used, the proportions of reactants should be adjusted accordingly to provide for esterification of these additional reactive groups. The alcohol and acid should be reacted sufficiently to produce an ultimate polyester resinous material having an acid number not greater than about 55 and usually an acid number from about 35 to about 40 for most purposes.

The well-known thermosetting unsaturated polyester resins and their preparation are disclosed in detail in U. S. Patents Nos. 2,255,313, 2,632,751 and 2,443,735 to 2,443,741, inclusive, which are incorporated herein by reference. In addition to the unsaturated alkyd resins, these compositions typically contain a monomeric cross-linking agent such as styrene or diallyl phthalate. The unsaturated polyester content may range from about 10 to about 90% of the total weight of copolymerizable material depending on the particular qualities desired in the final resin. For the majority of purposes, it is recommended that about 60 to about 80 parts by weight of the unsaturated alkyd resin be dissolved in 40 to 20 parts of polymerizable monomer.

The cross-linking component of the new compositions comprises one or more liquid monomers containing a $CH_2=C<$ group and having a melting point below about 15° C. and a boiling point above about 60° C. Among the myriad of suitable terminal ethylenic comonomers are: styrene, styrenes with alkyl and halogen substituents on the ring and side chain such as o-, m- and p-methyl styrenes, alpha methyl styrene, 2,4-dimethyl styrene, 2,3-dimethyl styrene, 2,5-dimethyl styrene, alpha chlorostyrene, alpha ethyl styrene, p-ethylstyrene, m-propyl styrene, bromostyrene, dichlorostyrene, isopropenyl toluene, vinyl naphthalene, and the o-, m- and p-chlorostyrenes and bromostyrenes; esters of alpha-methylene aliphatic monocarboxylic acids, such as methyl acrylate, ethyl acrylate, n-butyl acrylate, isobutyl acrylate, dodecyl acrylate, 2-chlorethyl acrylate, 2-chloropropyl acrylate, 2,2'-dichlorisopropyl acrylate, phenyl acrylate, cyclohexyl acrylate, methyl alpha-chloroacrylate, methyl methacrylate, ethyl methacrylate, methyl ethacrylate; acrylonitrile, methacrylonitrile; vinyl esters, such as vinyl acetate, vinyl chloroacetate, vinyl propionate, vinyl butyrate, vinyl laurate, vinyl stearate; vinyl ethers such as vinyl methyl ether, vinyl isobutyl ether, vinyl 2-chlorethyl ether; vinyl ketones, such as vinyl methyl ketone, vinyl hexyl ketone, methyl isopropenyl ketone; isobutylene; vinylidene halides, such as vinylidene chloride, vinylidene chlorofluoride; N-vinyl compounds such as N-vinyl pyrrole, N-vinyl carbazole, N-vinyl indole, N-vinyl succinimide; acrolein, methacrolein, acrylamide, methacrylamide, N-methylol acrylamide; and allyl compounds such as diallyl phthalate, tetrachlorodiallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, diallyl gluconate, diallyl methylgluconate, diallyl adipate, diallyl sebacate, diallyl citraconate, the diallyl ester of muconic acid, diallyl itaconate, diallyl chlorophthtalate, diallyl dichlorosilane, the diallyl ester of endomethylene tetrahydrophthalic anhydride, triallyl tricarballylate, triallyl aconitate, triallyl citrate, triallyl cyanurate, triallyl phosphate, trimethallyl phosphate, tetraallyl silane, tetraallyl silicate, hexallyl disiloxane, and the like.

The presence of a catalyst is usually desirable to effect the polymerization of the unsaturated polyester resin and the monomeric material containing the polymerizable $CH_2=C<$ group. Catalysts of the well-known peroxide class are preferred. The amount of the catalyst employed may vary over rather wide limits to give varying catalyzed stability. Thus, from about 0.1% to about 10% by weight, based on the total weight of the polymerizable composition, may be used. Preferably, from about 0.2 to about 2% by weight of the catalyst, based on the total weight of the polymerizable resinous composition, gives the desired results. A faster rate of cure usually results from increasing the catalyst content within the aforementioned limits. A few examples of the many suitable organic peroxide catalysts are benzoyl peroxide, succinyl peroxide, acetyl peroxide, methyl ethyl ketone peroxide, ditertiary butyl peroxide, cumene hydroperoxide, tertiary butyl hydroperoxide, cyclohexanone peroxide, perbenzoic acid, peracetic acid, anisoyl peroxide, toluyl peroxide, p-bromobenzoyl peroxide, tertiary butyl perbenzoate, p-menthane hydroperoxide, pinane hydroperoxide, diisopropylbenzene hydroperoxide, tertiary butyl peracetate, 1-cyclohexanol-1-hydroperoxide, furoyl peroxide and chloracetyl peroxide or any organic ozonide, such as diisopropylene ozonide, diisobutylene ozonide or a mixture of such substances may be used as the curing catalyst. Other free radical type polymerization catalysts that may also be used are such as $\alpha,\alpha$-azodiisobutyronitrile, the salts of inorganic per-acids, e. g., ammonium persulfate, sodium persulfate and the like.

It is advantageous to add a moderate amount of an inhibiting agent to the composition to increase the storage stability to the uncatalyzed mixture. Examples of inhibiting agents that may be used in my invention are such as hydroquinone, ditertiary butyl hydroquinone, pyrogallol, tannic acid, tertiary butyl catechol, di-tert-butyl p-cresol or an organic amine such as aniline or phenylene diamine. Mixtures of the inhibiting agents may also be used if desired. About 0.004% to about 0.02% of inhibiting agent by weight, based on the total weight of the resinous composition, usually gives satisfactory results.

The desirable and controllable curing cycle of the resinous composition of my invention is obtained by the addition to the polymerizable mixture of a small but effective amount of a promoter system for the catalyst. The promoter system employed comprises an amidino compound in combination with a mercaptan or sulfhydryl compound. A synergistic effect in the form of rapid gelation is obtained with this combination as is apparent from a comparison of the illustrative examples with the comparative examples in the table below. In addition to this unpredictable effect of greatly speeding up the polymerization of unsaturated polyester resins, another unexpected advantage has also been discovered in that many peroxide catalysts for these resins are operative at room temperature with the new promoter system whereas elevated temperatures are required in using them with certain other well-known promoters like cobalt naphthenate.

Any one or more of a wide variety of mercaptans or sulfhydryl compounds may be used in the present compositions. Aliphatic, aromatic and cycloaliphatic mercaptans are suitable agents, and they may have other functional groups in addition to the thiol radical as exemplified by the carboxyl group in thioglycollic acid. A partial list of suitable sulfhydryl compounds includes: sodium hydrosulfide, n-hexyl mercaptan, n-heptyl mercaptan, n-octyl mercaptan, n-nonyl mercaptan, n-decyl mercaptan, n-undecyl mercaptan, n-dodecyl mercaptan, n-tridecyl mercaptan, n-tetrodecyl mercaptan, n-hexadecyl mercaptan, secondary hexyl mercaptan, tert-hexyl mercaptan, tert-octyl mercaptan, mercaptoacetic acid, thioacetic acid, p-toluenethiol, p-mercapto-phenol, 2-mercaptobenzoic acid, 4-mercaptoquinazoline, thio-$\alpha$-toluamide, thioacetamide thioacetanilide, 2-naphthalenethiol, cysteine hydrochloride, trithiocyanuric acid, thiohydrantoin, thiobarbituric acid, cyclohexyl mercaptan, calcium and ammonium hydrosulfides, and even gaseous hydrogen sulfide. While from about 0.001 to about 1.0% of the selected sulfhydryl compound may be used based on the total weight of unsaturated alkyd and copolymerizable monomer in the resinous composition, quantities ranging from about 0.005 to about 0.15% are recommended for purposes.

There is also a large number of substances which may be chosen as the amidino component of the promoter system. Any one or more compounds boiling above about 60° C. and containing a basic

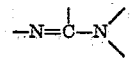

group or tautomers thereof or acid salts of either may be used. These amidines or guanyl compounds may be either unsubtituted or substituted with a wide variety of aromatic, aliphatic or cycloaliphatic radicals. While this ingredient of the promoter combination may be employed without modification, it is often desirable to utilize the acid salt form of the amidino compound because basic compounds are apt to reduce or destroy the ultraviolet light absorbing power of certain hydroxylated benzophenones. Many different organic and inorganic acids are suitable for preparing these amidino salts; for instance hydrochloric, hydrobromic, sulfuric, nitric, phosphoric, carbonic, acetic, formic and the like acids.

Examples of organic compounds and the salts thereof containing the basic

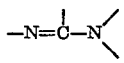

group which may be employed in the resinous compositions of the invention are the guanidines, e. g., dicyclohexyl guanidine, 1,2-diphenyl guanidine, diphenyl-p-tolyl-guanidine hydrochloride, di-o-tolylguanidine, 1,3-dixylyl-guanidine, dodecylguanidine, 1,3-bis(2-chloro-4-methoxyphenyl) guanidine hydrobromide, guanidine hydrochloride, ethylene guanidine hydrochloride, 1,1'-(ethylene di-p-phenylene)diguanidine hydrochloride, 1-ethyl-2,3,4-triphenylguanidine hydrochloride, p-hydroxybenzyl guanidine, methoxyguanidine sulfate, N,N-dicyclohexylguanidine, butyldicyclohexyl guanidine bicarbonate, octylguanidine nitrate; the isomelamines, e. g., 1,3,5-tribenzylisomelamines, triphenylisomelamines; the amidines, e. g., acetamidine, benzamidine, laurylamidine hydrochloride, dodecylamidine hydrochloride, acetamidine hydrochloride; the biguanides, e. g., phenylbiguanide hydrochloride, isopropylbiguanide hydrochloride, 1,1-bis(2-hydroxyethyl)-3,5-bis(3-methoxypropyl)-biguanide acetate, 1-(p-bromophenyl)-biguanide hydrochloride, p-chlorophenyl biguanide; the biguanidines, e. g., (3-dibenzofuryl)methylbiguanidine, 1-(p-iodophenyl)biguanidine hydrochloride, (p-methoxyphenyl) sulfanilylbiguanidine, o-tolylbiguanidine, 1-(p-chlorophenyl)-5-isopropylbiguanidine, 1-(2-dibenzofuryl)biguanidine, phenylbiguanidine hydrochloride, isopropylbiguanidine hydrochloride; the guanylureas, e. g., guanyl(phenylsulfonyl) guanylurea, 1-guanyl-2-thioguanylurea carbonate, heptylguanylurea, 1-hexyl-1-methyl-guanylurea, (2-hydroxyethyl) guanylurea, 1-(alpha-hydroxybutyryl)guanylurea; the pseudoureas or isoureas and their tautomers, e. g., 2-(7-chloro-4-methyl-2-guinolyl)-2-thiopseudourea hydrochloride, 2-p-cyanobenzyl-2-thiopseudourea hydrochloride, 2-cyclohexylpseudourea, 2-decylpseudeourea, ethylpseudourea, 2-dodecylpseudourea hydrochloride, 2-(dodecyloxymethyl)-2-thiopseudourea hydrochloride, laurylpseudourea hydrochloride, dimethylallyl pseudourea; the pseudothioureas and their tautomers, e. g., ethylpseudothiourea and the ethyl pseudothiourea hydrobromides; and the like.

Based on the content of active material, that is omitting the weight of any acid component, the amidino compound desirably amounts to between about 0.0003 and about 0.5% of the total weight of unsaturated alkyd resin and cross-linking monomer, 0.001 to 0.1% being preferred for most purposes. While larger quantities may often be utilized, increasing the concentration of this component beyond the stated range impairs the accelerating effect of the promoter combination in some cases.

The conventional additives of the prior polyester resin art in the usual quantities are adaptable to use with the novel copolymerizable mixtures and polymerization products of the present invention. Many of these are disclosed in the aforementioned U. S. patents and thus need not be set forth here in detail except to mention that such additives include other promoters for use in conjunction with the catalyst for curing at room or lower temperatures; mold lubricants; fire-retardant agents including compounds containing chlorine and phosphorus; fillers and reinforcements like ground asbestos and glass fibers; inhibitors, like hydroquinone, to stabilize the resin mixtures against premature gelation; colorants such as compatible dyes and pigments; and plasticizers.

As an optional ingredient of the new resin formulations, an ultraviolet light absorbing agent may be included in an amount ranging from about 0.05 to about 3.0% or more based on the total weight of polymerizable matter, 0.2 to 1.0% being preferred, to eliminate or minimize yellowing in the case of light-transmitting or light-colored products. This additive is unnecessary for dark resin formulations. The class of hydroxylated benzophenones, including those containing other substituents, is especially recommended since this group of compounds does not undergo any color change upon absorbing ultraviolet radiation. A few of the many suitable agents are 2,2'-dihydroxy-4-methoxybenzophenone, 2,2'-dihydroxy-4,4'-dimethoxybenzophenone, 2 - hydroxy - 4 - methoxybenzophenone, 2 - hydroxy - 4' - methoxybenzophenone, 2 - hydroxy - 4,4' - dimethoxybenzophenone, 2,4 - dihydroxybenzophenone, 2 - hydroxy - 5 - salicylylbenzophenone, and like compounds.

Curing of any of the new liquid resin compositions may be accomplished with or without added pressure in the atmosphere or in closed molds at temperatures ranging from about 10° C. up to 150° C. or even higher temperatures as long as they are kept below the point at which resin degradation commences. Where convenient, it is often desirable to form the copolymers by heating the catalyzed resin-forming mass to between 90 and about 120° C. for a period of about 10 to 90 minutes to expedite production.

The components of the novel promoter system is introduced into the resinous composition prior to the gelation thereof. Since certain mercaptans tend to reduce the storage life of the resin compositions, it is sometimes desirable to add this component a few htours or few days before the resin is used. Both ingredients of the promoter system can be incorporated in the resin compositions by simply mixing them with the other components, but it is often desirable to add them as solutions in suitable liquids in order to insure the uniform dispersal of the small quantities of these compounds throughout the large mass of the resin. In addition, it is a simpler matter to measure a quantity of a minor additive by measuring the volume of a solution then by weighing a solid. For example, the amidino compound may be dissolved in a polyhydric alcohol such as diethylene glycol and added as a 10% solution to the resin composition while the sulfhydryl compound may be similarly added as a 10% solution in styrene. It is customary to add the polymerization catalyst to the resin composition last inasmuch as only a limited amount of time for mixing remains after the catalyst has been incorporated in the resin before gelation occurs.

The novel cured resins possess the excellent and well-known qualities of polyester resins in general. During their polymerization, no gases are evolved in the curing operation. Since water-white, transparent products are obtainable, they, of course, may be dyed or pigmented in a limitless variety of shades and hues. In view of their good physical properties, the new resinous compositions have broad utility in many fields including use as coating and film-forming materials, adhesives, binding agents, impregnating agents, molding compositions, laminating and casting resins, and in reinforced plastic articles such as corrugated and flat structural panels.

For a better understanding of the nature and objects of this invention, reference should be had to the accompanying illustrative examples wherein all proportions are expressed in terms of weight unless otherwise stated therein. Comparative examples are denoted by letters whereas examples demonstrating the present invention are numbered.

*Examples 1–12*

Under an inert atmosphere of nitrogen in a suitable closed reaction vessel, propylene glycol, phthalic anhydride and maleic anhydride are reacted at reflux temperature in relative proportions of 2.2:1.0:1.0 mols, respectively, until the acid number of the reaction mixture is between 35 and 40. After cooling the resulting unsaturated linear alkyd resin to room temperature, it is thoroughly blended with styrene in a weight ratio of 69:31, respectively, and 0.0115% of hydroquinone based on the total weight of the mixture is dissolved therein to inhibit the composition against premature gelation. The resulting liquid resin composition is divided into a plurality of batches and the various additives listed in the table below are incorporated in separate batches of resin in the specified quantities based on the total weight of liquid resin with thorough mixing. Then the gel time is determined with benzamidine hydrochloride and lauryl mercaptan each present individually in some mixtures and as a combination in others, using benzoyl peroxide (BP), cumene hydroperoxide (CHP) and methyl ethyl ketone peroxide (MEKP) as the catalysts. In addition, a portion of each of these catalyzed resin compositions is employed to laminate several plies of glass cloth which are cured in the usual manner and found to provide laminates having the same excellent physical properties as a laminate prepared with the same resin with no promoters therein.

| Example | Percent Lauryl Mercaptan | Percent Benzamidine HCl | Percent Catalyst | Gel Time at 25° C. |
|---|---|---|---|---|
| A | 0.2 |  | 2.0 CHP | >24 hrs. |
| B |  | 0.03 | 2.0 CHP | >3 hrs. |
| C | 0.5 |  | 2.0 CHP | >90 min. |
| D | 0.1 |  | 2.0 CHP | >90 min. |
| E |  | 0.05 | 2.0 CHP | >90 min. |
| 1 | 0.005 | 0.001 | 0.5 CHP | 7 min. |
| 2 | 0.05 | 0.005 | 0.5 CHP | 5 min. |
| 3 | 0.005 | 0.1 | 0.5 CHP | 9 min. |
| 4 | 0.005 | 0.2 | 0.5 CHP | 30 min. |
| 5 | 0.01 | 0.003 | 0.5 CHP | <4 min. |
| 6 | 0.1 | 1 (0.01) | 0.25 CHP | 5 min. |
| F | 0.2 |  | 0.5 BP | >4 hrs. |
| G |  | 0.03 | 0.5 BP | >24 hrs. |
| 7 | 0.05 | 0.005 | 1.0 BP | 35 min. |
| 8 | 0.01 | 0.01 | 1.0 BP | 46 min. |
| 9 | 0.1 | 0.05 | 1.0 BP | 40 min. |
| 10 | 0.01 | 0.01 | 1.0 MEKP | <4 min. |
| 11 | 0.01 | 0.01 | 1.0 MEKP | <3 min. |
| 12 | 0.02 | 1 (0.01) | 1.0 MEKP | 6 min. |

[1] Ethylene guanidine hydrochloride substituted for the benzamidine salt.

*Example 13*

Another polyester is prepared in a similar manner from 3.3 mols of propylene glycol, 2 mols of phthalic anhydride and 1 mol of maleic anhydride. A mixture is made of 62 parts of this unsaturated alkyd resin, 38 parts of styrene, 0.0115 part of hydroquinone and sufficient cobalt naphthenate to provide 0.32 part of cobalt. This liquid resin composition is divided into 4 portions, and an additional promoter system in the form of 0.12% of laurylamidine hydrochloride and 0.12% of thioglycollic acid (glycollic acid mercaptan) is added in the form of 10% solutions in dibutyl phthalate. Then 0.5%, based on the weight of total polymerizable matter, of tert-butyl hydroperoxide is stirred in to catalyze each of the various batches of resin. Of the two batches containing the amidine-mercaptan promoter combination, one is cured at room temperature and the other at 180° F.; and while both batches gel within a matter of minutes, the one heated to the elevated temperature gels much more rapidly. The comparative samples which are free of the amidine-mercaptan promoter system are treated similarly, and it is observed that the gelation takes much longer in both instances and the batch maintained at room temperature fails to cure to a hardened mass even after several days.

*Example 14*

A polymerizable unsaturated polyester is prepared by reacting 667 parts of diethylene glycol, 232 parts fumaric acid and 584 parts of adipic acid under an inert nitrogen atmosphere at an elevated temperature until the acid number drops to between 15 and 20. The thermosetting resin is made up by mixing 1 part of this polyester with 2 parts of methyl styrene. This composition is then split into two batches and one is mixed with 0.03% of ethylene guanidine hydrochloride and 0.06% of thiourea together with 0.05% of 2-naphthalene-thiol, all being introduced as 10% solutions in diethylene glycol. Both resin batches are cured at elevated temperatures in the presence of 2% of cyclohexanone peroxide as a catalyst uniformly distributed therethrough. It is found that the resin containing the promoter combination gels in a small fraction of the time required for gelation of the other batch of resin.

*Example 15*

An alkyd resin is prepared by reacting 252 parts of propylene glycol, 296 parts of phthalic anhydride and 106 parts of fumaric acid at elevated temperature until the acid number is between 30 and 40. A mixture is made of 62 parts of this polyester and 38 parts of styrene; then a promoter combination is added in the form of 0.5% of dicyclohexyl guanidine and 1.0% of 2-mercaptobenzoic acid as 20% solutions in ethylene glycol. When this resin composition is catalyzed with 0.2% of 1-cyclohexanol-1-hydroperoxide, gelation rapidly takes place at room temperature in the gel test procedure. The cured casting displayed good physical properties and had an excellent appearance.

*Example 16*

Still another unsaturated alkyd resin is made by reacting 1.8 mols of ethylene glycol, 1.5 mols of diethylene glycol, 2 mols of maleic anhydride and 1 mol of phthalic anhydride in the usual manner and split into 2 equal portions of 85 parts each. One of these batches is mixed thoroughly with 15 parts of diallyl phthalate, 0.008 part of hydroquinone, 0.1 part of ethyl pseudothiourea hydrobromide and 0.1 part of n-nonyl mercaptan and later catalyzed with 0.5% by weight of pinane hydroperoxide. The other batch is compounded similarly except for omitting the mercaptan and thiourea to serve as a control. It is found that gelation occurs at 180° F. in the S. P. I. test far more rapidly in the novel resin containing the promoter system than in the control resin composition.

While there are above disclosed only a limited number of the embodiments of the compositions and processes of the invention herein presented, it is possible to produce still other embodiments without departing from the inventive concept herein disclosed, and it is desired, therefore, that only such limitations be imposed on the appended claims as are stated therein or required by the prior art.

We claim:

1. A composition of matter comprising (1) an unsaturated polyester resin prepared by reacting a polyhydric alcohol with an $\alpha, \beta$, ethylenically unsaturated polycarboxylic acid; (2) a monomer copolymerizable with said (1) and containing a $CH_2=C<$ group and having a boiling point of at least 60° C.; (3) from about 0.001 to 1.0%, based on the combined weight of said (1) and (2), of a sulfhydryl compound and (4) from about 0.0003 to 0.5%, based on the combined weight of said (1) and (2), of a substance selected from the group consisting of the guanidines, isomelamines, amidines, biguanides, guanylureas, pseudoureas, pseudothioureas and the salts thereof.

2. A composition according to claim 1 in which said substance comprises benzamidine hydrochloride.

3. A composition according to claim 1 in which said substance comprises ethylene guanidine hydrochloride.

4. A composition according to claim 1 in which said substance comprises laurylamidine hydrochloride.

5. A composition according to claim 1 in which said substance comprises dicyclohexyl guanidine.

6. A composition according to claim 1 in which said substance comprises ethyl pseudothiourea hydrobromide.

7. A composition of matter comprising (1) an unsaturated polyester resin prepared by reacting a polyhydric alcohol with an $\alpha, \beta$, ethylenically unsaturated polycarboxylic acid; (2) a monomer copolymerizable with said (1) and containing a $CH_2=C<$ group and having a boiling point of at least 60° C.; (3) from about 0.001 to 1.0% of an alkyl mercaptan, and from about 0.0003 to .5% of (4) benzamidine hydrochloride.

8. A composition according to claim 7 in which the alkyl mercaptan comprises lauryl mercaptan.

9. A composition of matter comprising (1) an unsaturated polyester resin prepared by reacting a polyhydric alcohol with an α, β, ethylenically unsaturated polycarboxylic acid; (2) a monomer copolymerizable with said (1) and containing a $CH_2=C<$ group and having a boiling point of at least 60° C.; (3) from about 0.001 to 1.0% of an alkyl mercaptan, and from about 0.0003 to 0.5% of (4) ethylene guanidine hydrochloride.

10. A process which comprises copolymerizing an unsaturated polyester resin prepared by reacting a polyhydric alcohol with an α, β, ethylenically unsaturated polycarboxylic acid; and a monomer containing a $CH_2=C<$ group and having a boiling point of at least 60° C. in the presence of an organic peroxide polymerization catalyst, from about 0.001 to 1.0%, based on the combined weight of said polyester and said monomer, a sulfhydryl compound, and from about 0.0003 to 0.5%, based on the combined weight of said polyester and said monomer, of a substance selected from the group consisting of the guanidines, isomelamines, amidines, biguanides, guanylureas, pseudoureas, pseudothioureas and the salts thereof.

11. A process according to claim 10 in which said substance comprises benzamidine hydrochloride.

12. A process according to claim 10 in which said substance comprises ethylene guanidine hydrochloride.

13. A process according to claim 10 in which said substance comprises laurylamidine hydrochloride.

14. A process according to claim 10 in which said substance comprises dicyclohexyl guanidine.

15. A process according to claim 10 in which said substance comprises ethyl pesudothiourea hydrobromide.

16. A process which comprises copolymerizing an unsaturated linear polyester prepared by reacting a polyhydric alcohol with an α, β, ethylenically unsaturated polycarboxylic acid with a monomer containing a $CH_2=C<$ group and having a boiling point of at least 60° C. by reaction in admixture with an organic peroxide polymerization catalyst, from about 0.001 to 1.0 percent of an alkyl mercaptan and from about 0.0003 to 0.5 percent of benzamidine hydrochloride based on the total weight of the polyester and the monomer.

17. A process which comprises copolymerizing an unsaturated linear polyester prepared by reacting a polyhydric alcohol with an α, β, ethylenically unsaturated polycarboxylic acid with a monomer containing a $CH_2=C<$ group and having a boiling point of at least 60° C. by reaction in admixture with an organic peroxide polymerization catalyst, between about 0.001 to 1.0 percent of an alkyl mercaptan and from about 0.0003 to 0.5 percent of ethylene guanidine hydrochloride based on the total weight of the polyester and the monomer.

References Cited in the file of this patent
UNITED STATES PATENTS

| | | |
|---|---|---|
| 2,452,669 | Levine | Nov. 2, 1948 |
| 2,466,800 | Fisk | Apr. 12, 1949 |